D. W. MOORE.
BALE TAG.
APPLICATION FILED AUG. 24, 1917.
1,269,630.
Patented June 18, 1918.
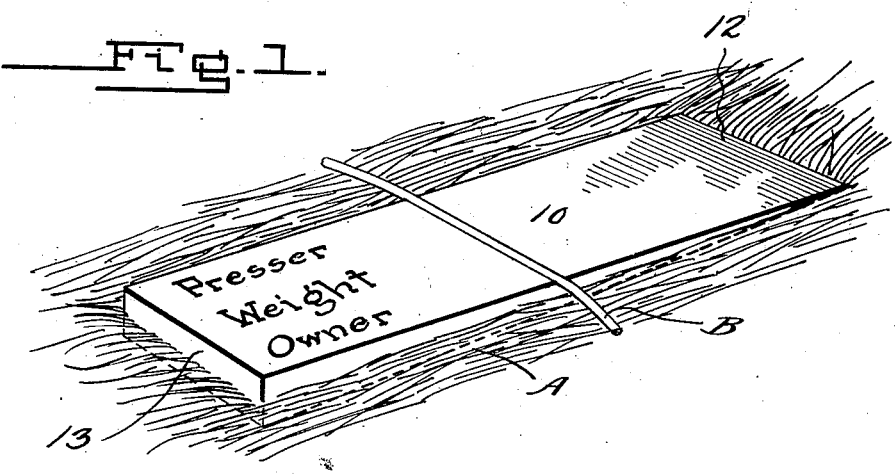
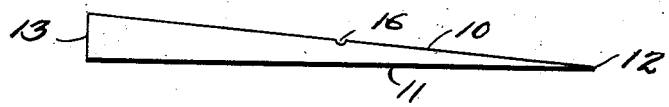
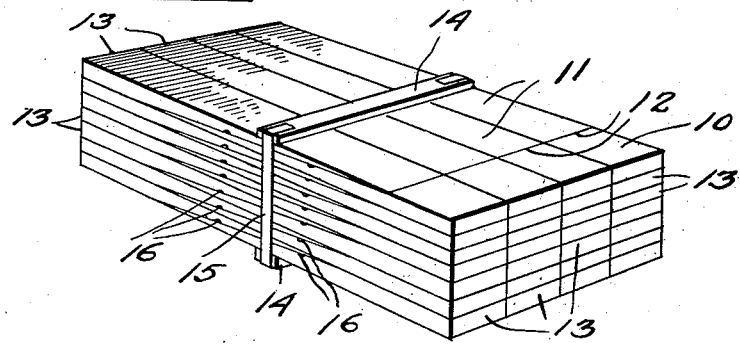
Inventor
Dorus W. Moore
By Lancaster and Allwine
his Attorneys

UNITED STATES PATENT OFFICE.

DORUS W. MOORE, OF FULTONVILLE, NEW YORK.

BALE-TAG.

1,269,630.

Specification of Letters Patent.

Patented June 18, 1918.

Application filed August 24, 1917. Serial No. 188,018.

*To all whom it may concern:*

Be it known that I, DORUS W. MOORE, a citizen of the United States, and a resident of Fultonville, in the county of Montgomery and State of New York, have invented a certain new and useful Improvement in Bale-Tags, of which the following is a specification.

The present invention relates to tags and the like, and more particularly to a tag adapted for application to bales of hay, cotton and the like.

An object of the present invention is to provide a tag which may be readily inserted beneath the tie of the bale after the latter has been formed, and which will not curl up and become torn or detached during the handling of the bales.

Another object is to provide a tag of this character which is of such construction that a plurality of the tags may be closely packed together for transportation and handling prior to their use.

The above, and various other objects and advantages of this invention will be in part described, and in part understood, from the following detailed description of the present preferred embodiment, the same being illustrated in the accompanying drawing wherein:

Figure 1 is a perspective view of a tag constructed according to the present invention and as applied to a bale of hay.

Fig. 2 is a longitudinal edge view of the tag.

Fig. 3 is a perspective view of a package of the tags ready for sale and shipment.

Referring to this drawing, A indicates the side of a bale of hay or the like which is held together by a tie B, the latter being shown as of wire in the present instance.

The body of the improved tag is of wedge shape, the latter being provided with upper and lower relatively flat faces 10 and 11 which converge from end to end of the tag, and which terminate in a relatively sharp or thin edge 12, at one end. The side portions of the body of the tags are preferably arranged in parallelism with each other, and the opposite end of the tag is formed with a relatively flat face 13.

Tags applied to bales of hay and the like, are adapted to bear the name of the person who compresses the bale, the weight of the bale, and the owner of the material which is baled. For this purpose, the upper flat face 10 is provided at suitable portions thereof with the wording "Presser", "Weight" and "Owner" so arranged as to leave blank spaces adjacent to the respective words to be filled in with the required names and the weight.

The upper and lower sides 10 and 11 converge toward one end of the body portion by inclining the upper side 10 toward the lower or base side 11. By virtue of such formation of the body portion of the tag a plurality of the latter may be assembled in superposed relation and in inverted order, as shown in Fig. 3 to provide a pack or stack of the tags. The package of the tags may be made up of a plurality of stacks thereof held together by top and bottom strips 14 which extend transversely across the top and bottom portions of the package, and which are connected together at their opposite ends by straps 15. It will be noted from Fig. 3 that the tags are interfitted or overlapped at their end portions 12 so that the package is of uniform dimension at opposite ends.

If desired, the body of the tag may be provided, across its upper face 10, with a transversely extending groove or recess 16 into which is adapted to seat the tie B for the purpose of yieldingly holding the tag from slipping beneath the tie.

After the bale has been formed, the tag may be inserted beneath the tie B by engaging the edge portion 12 of the tag beneath the bale and forcing or driving the body of the tag therebeneath. The flat end face 13 may be engaged by the fingers for this purpose, or may be struck with a hammer or the like to bind the tag tightly beneath the tie B. The lower edge of the body of the tag, adjacent the flat end portion B, is adapted to sink into the material of the bale and to thus catch and hold the tag from movement outwardly from beneath the tie B.

These tags are adapted to be made of wood, or other light and economical material. The tags are relatively stiff, and cannot curl up at their opposite end or lateral edges and expose to view at all times the data which is written upon the outer face 10 of the tags. As the opposite end and lateral edges of the tag body are arranged in substantially parallelism, the same bite or bind in the material of the bales and hold the tag body from lateral and longitudinal displacement. The tag of course may be used repeatedly until broken or lost.

It is of course understood that the tag body may be given various fanciful forms and may be provided with other suitable data upon the face thereof without departing from the spirit of this invention, such changes or modifications being restricted only by the scope of the following claims.

I claim:—

1. A bale tag comprising an elongated wedge-shaped body portion adapted to be introduced at its smaller end beneath the tie of a bale and having a flat upper face adapted to receive data thereon, said body portion being provided at its bottom face and at its larger end with a transverse shoulder adapted to engage in the material of the bale and having a groove across its upper face to retain the tag from displacement.

2. A bale tag comprising an elongated wedge-shaped body portion provided with upper and lower relatively flat sides and adapted to be introduced beneath the tie of a bale, said body portion having a recess extending across the upper side thereof intermediate the ends of the body portion to receive said tie therein and anchor the tag from displacement from beneath the tie.

DORUS W. MOORE.

Copies of this patent may be obtained for five cents each, by addressing the "Commissioner of Patents, Washington, D. C."